Dec. 6, 1966 E. BELLEM 3,290,617

FREQUENCY MODULATED RELAXATION OSCILLATOR

Filed July 9, 1962 5 Sheets-Sheet 1

INVENTOR
EDWARD BELLEM
BY Smart & Biggar
ATTORNEYS.

INVENTOR
EDWARD BELLEM
BY Smart & Biggar
ATTORNEYS.

INVENTOR
EDWARD BELLEM
BY Smart & Biggar
ATTORNEYS.

INVENTOR
EDWARD BELLEM
BY Smart & Biggar
ATTORNEYS.

FREQUENCY MODULATED RELAXATION OSCILLATOR

Filed July 9, 1962 5 Sheets-Sheet 5

INVENTOR
EDWARD BELLEM
BY Smart & Biggar
ATTORNEYS.

3,290,617
FREQUENCY MODULATED RELAXATION OSCILLATOR

Edward Bellem, Ottawa, Ontario, Canada, assignor to Northern Electric Company Limited, Quebec, Canada
Filed July 9, 1962, Ser. No. 208,381
21 Claims. (Cl. 332—14)

This invention relates to a frequency modulated relaxation oscillator that is particularly suitable for generating linear frequency modulated oscillations.

Such a linear frequency modulated oscillator is often required for the transmission of different types of communication signals where high quality of transmission is required, e.g., in multichannel telephone, television or musical systems. In such systems, a message channel is modulated on a sub-carrier for transmission over open wire lines, cables or radio links.

Prior to applicant's invention, it was well known to charge a capacitor through a resistor under control of a modulating frequency source voltage superimposed upon a D.C. source voltage. When the charge on the capacitor reached a predetermined level switching means closed a discharge circuit for the capacitor for a rapid discharge thereof. This process of charging and discharging the capacitor was repetitive and the frequency of the oscillation produced was determined by the R–C time constant and the modulating frequency source voltage superimposed upon the D.C. source voltage. When the predetermined voltage at which discharge took place was kept low in comparison to the modulating frequency source voltage superimposed upon the D.C. source voltage, the relation between the modulating frequency source voltage and the frequency deviation of the frequency modulated oscillation was approximately linear.

In the prior art arrangement, the variable charging time of the capacitor was linearly related to the modulating frequency source voltage superimposed upon the D.C. source voltage. However, during each oscillation cycle the discharge time of the capacitor added a constant time to the variable charging time thereof that was not linearly related to the source voltages. Thus, the linear relation between the modulating frequency source voltage and the frequency deviation of the frequency modulated oscillations was lost due to the discharge time of the capacitor. This loss of linearity was particularly apparent at higher frequencies where the discharge time of the capacitor formed a larger portion of the time for one oscillation cycle.

Applicant has discovered a way to avoid the undesirable constant time produced by the discharging of the capacitor in a frequency modulated relaxation oscillator whereby the above disadvantages are overcome permitting the linearity of the oscillator to be improved and the maximum frequency at which linearity can be obtained to be increased. According to applicant's invention, a frequency modulated relaxation oscillator is provided utilizing a reactive relation element such as a capacitor or an inductor. Means are provided for causing current to alternately flow in one direction in the element for an interval of time and in a reverse direction to said one direction in the element for an interval of time under control of a modulating frequency source voltage superimposed upon the D.C. source voltage, and means for alternating the flow to said element in said one and reverse directions whenever the voltage across or the current flowing to said element reaches a predetermined level of one polarity and substantially the same level of opposite polarity respectively.

In one embodiment of the invention, the frequency modulated oscillations are produced by connecting the element in an integrating circuit. The current flow in the element in said one and reverse directions is controlled by generating a substantially square wave pulse signal of which the amplitude of each pulse is limited according to the amplitude of the modulating frequency source voltage superimposed upon the D.C. source voltage. This square wave pulse signal is then intergrated in the integrating circuit to derive an integrating signal. The polarity excursion of the pulse signal is reversed under control of the integrated signal whenever the amplitude thereof reaches a predetermined level.

In another embodiment of the invention, the element used is a capacitor. The current flow in the capacitor in said one and reverse directions is controlled by connecting the modulating frequency source voltage superimposed upon the D.C. source voltage in one polarity sense in a series loop with the capacitor and a resistor. The voltage across the capacitor is then measured while current is flowing therein and the polarity sense of the modulating frequency source voltage superimposed upon the D.C. source voltage applied to the series loop is reversed whenever the voltage across the capacitor reaches a predetermined level.

As can be readily understood from the above, the current flow time in both directions in the element is linearly related to the modulating frequency source voltage superimposed upon the D.C. source voltage and hence the linearity of the oscillations produced is greatly improved. The only non-linear constant time that is added to the linear variable time in one oscillation cycle is *that* time required for switching the flow of current in the element from one direction to the other. Of course, this switching time is considerably shorter than the discharging time of a capacitor as exemplified by the prior art arrangement.

Another cause of non-linearity in a relaxation oscillator is the non-linear voltage-time characteristic of a capacitor. This effect is more pronounced at lower frequencies because a relatively larger part of the voltage-time characteristic is used while current is flowing in the capacitor. The effect of the switching time required to switch the flow of current from one direction to the other is most apparent at higher frequencies where this time forms a relatively larger part of the time necessary to perform one oscillation cycle. According to another embodiment of applicant's invention, these two types of undesirable non-linear effects are further reduced by providing a compensating resistor to be used in conjunction with the capacitor. The effect of this compensating resistor is to produce at the moment of switching, a voltage that is opposed to the voltage across the capacitor that is linearly related to the modulating frequency source voltage superimposed upon the D.C. source voltage. The provision of the compensating resistor permits the capacitor to reach its switching level in a shorter amount of time. Thus, the non-linearity due to the voltage-time characteristic of a capacitor at lower frequencies and the finite switching time at higher frequencies is reduced.

Preferred embodiments of my invention will now be described, by way of example, with reference to the accompanying drawings. The same reference designations will be used for similar parts in the figures of the drawings in which:

FIG. 1*a* and FIG. 1*b* respectively show a partially-schematic, partially-block diagram and a voltage-time wave form of a typical prior art arrangement;

FIGS. 2*a* and 2*b* respectively show a partially-schematic, partially-block diagram and voltage-time wave forms illustrating the principles of one embodiment of applicant's invention;

Figures 4, 5:
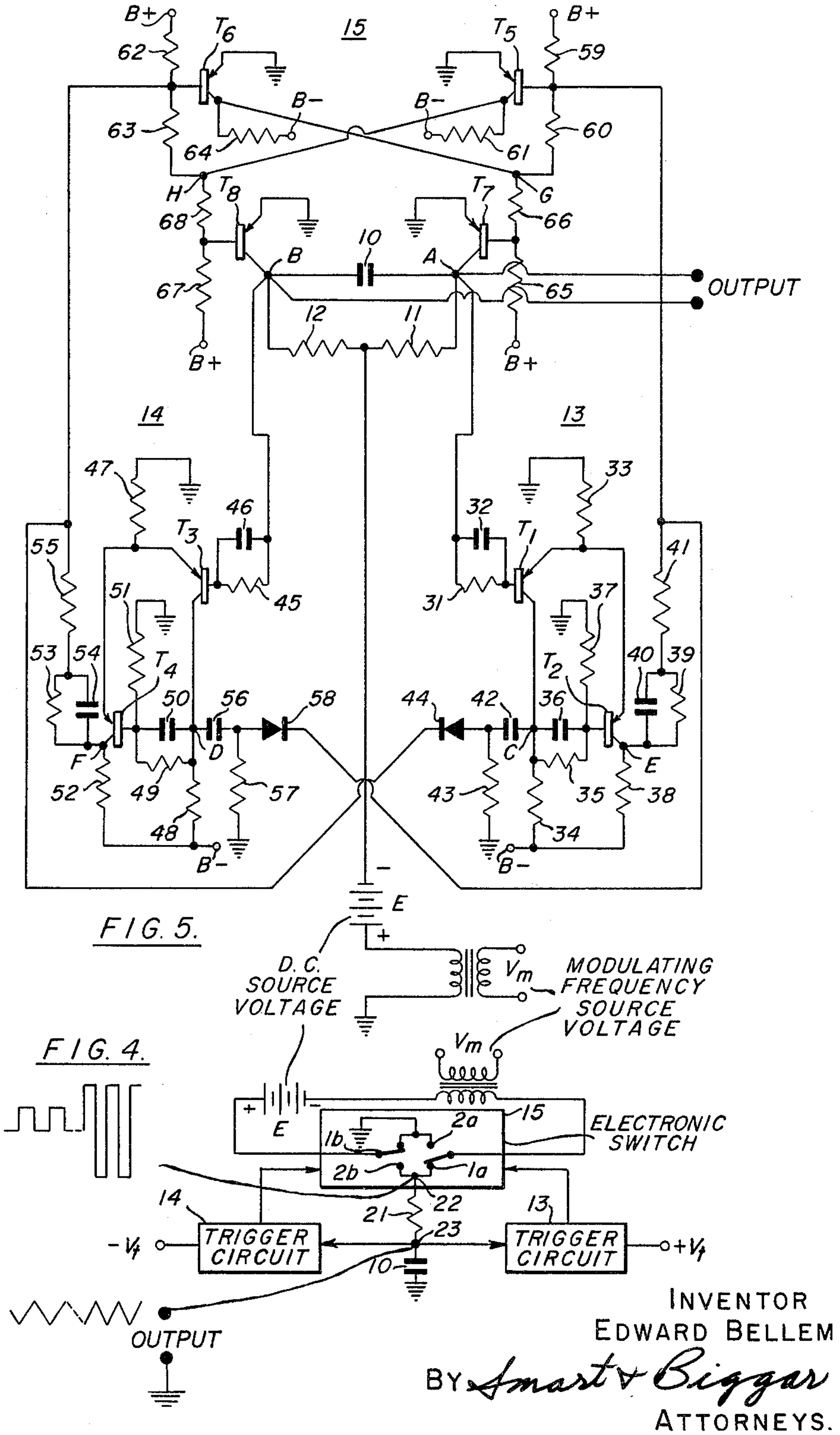
FIG. 5 is a complete diagram utilizing the principles of the embodiment shown in FIG. 2*a*.
Figure 7A:
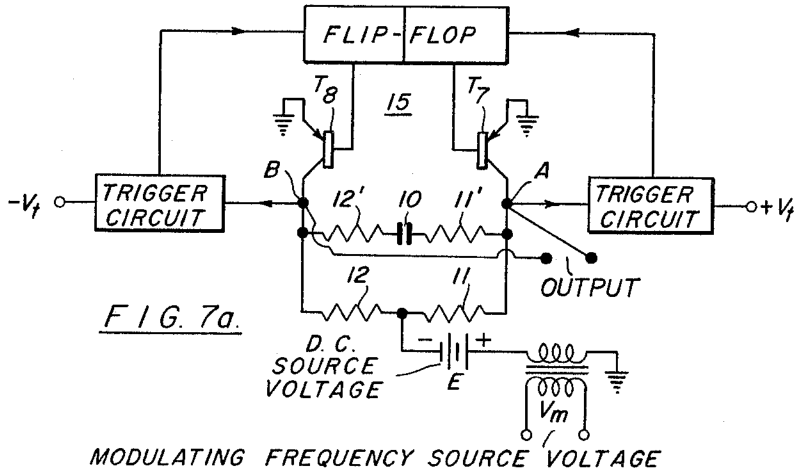
Figures 7B, 8:
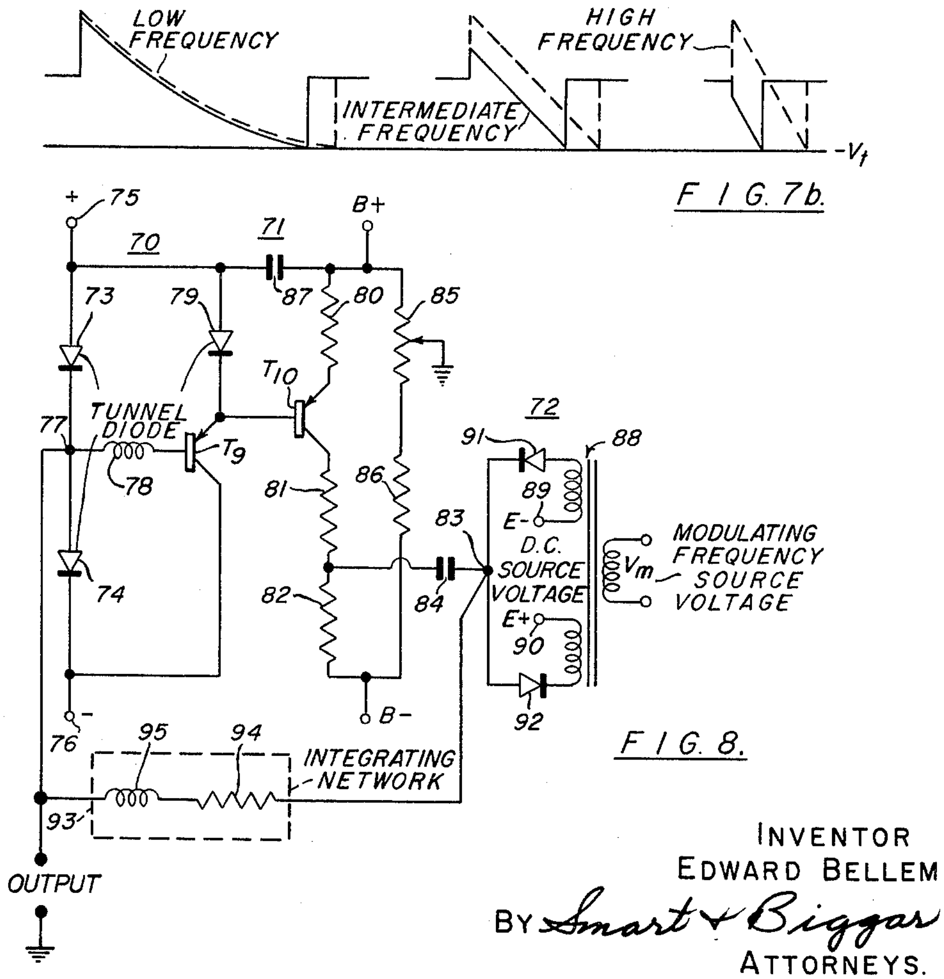
Figure 9:
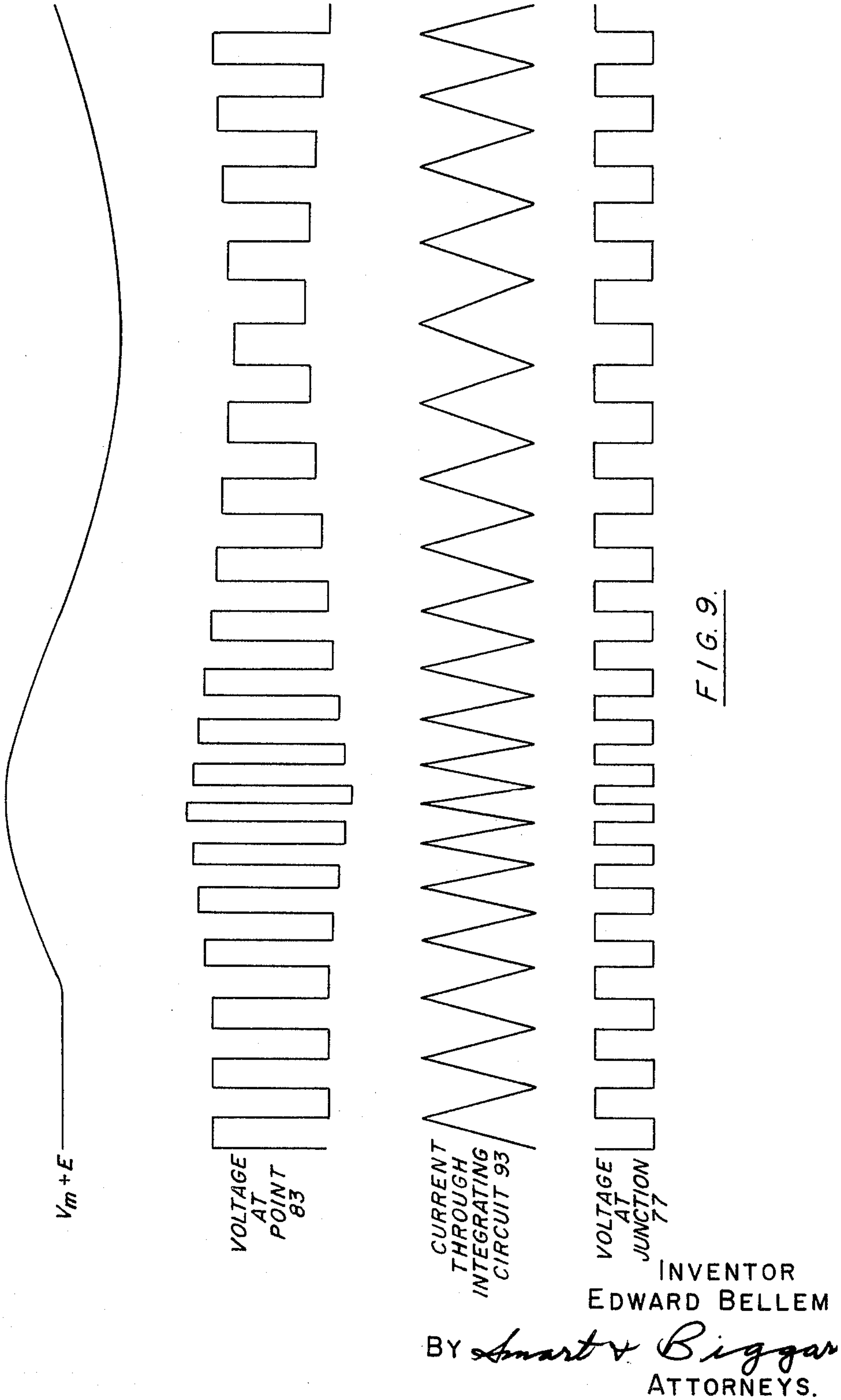

FIGS. 7*a* and 7*b* respectively show a partially-schematic, partially-block diagram and associated wave forms illustrating a modification of the circuit of FIG. 5 where compensating resistors are used;

FIG. 8 shows a circuit diagram illustrating the principles of a further embodiment of applicant's invention; and FIG. 9 is a set of signal wave forms at various points in the circuitry of FIG. 8.

Figures 1A, 1B, 2A, 2B:
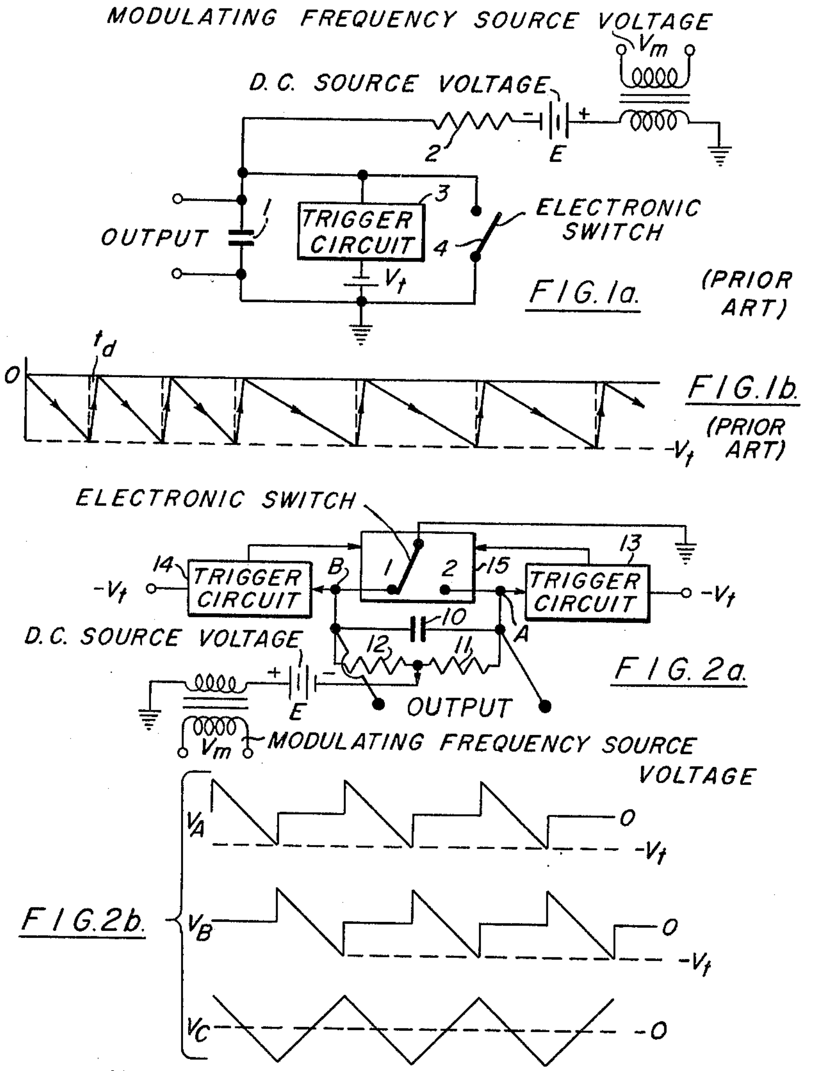

Referring to the drawings, FIGS. 1*a* and 1*b* illustrate a typical prior art arrangement that will serve as a useful comparison between the disadvantages of the prior art arrangement and the subsequent advantages of applicant's invention. In FIG. 1*a*, a capacitor 1 is charged through a resistor 2 in response to a modulating frequency source voltage $V_m$ superimposed upon a D.C. source voltage E. When the charge across the capacitor 1 reaches a predetermined voltage $V_t$ a trigger circuit 3 is energized and closes a discharge path for the capacitor 1 through an electronic switch 4, whereby the capacitor rapidly discharges. When the capacitor 1 has been completely discharged, the trigger circuit 3 opens the discharge path and the process is repeated. The frequency of the oscillation produced is determined by the R–C time constant and the amplitude of $E+V_m$, and the triggering voltage $V_t$. If $V_t$ is kept low in comparison to $E+V_m$, the relation between the modulating frequency source voltage $V_m$ and the frequency deviation $\Delta F$ is approximately linear.

The output voltage taken across the capacitor 1 is shown in FIG. 1*b*. The variable charging time of the capacitor 1 from 0 volts to $-V_t$ volts is linearly related to $E+V_m$. However, the discharge time of the capacitor 1 from $-V_t$ volts to 0 volts adds a constant time to the variable charging time of the capacitor during each oscillation cycle that is not linearly related to $E+V_m$. The non-linear discharge time that deviates from the theoretical 0 discharge time is represented in FIG. 1*b* by $t_d$. Thus, the linear relationship between $E+V_m$ and the frequency deviation $\Delta F$ is lost due to the discharge time of the capacitor. It will be readily understood that this loss of linearity is particularly apparent at higher frequencies where the discharge time of the capacitor 1 forms a larger portion of the time of one oscillation cycle.

Referring to FIGS. 2*a* and 2*b*, the principles of one embodiment of applicant's invention will be described to show how the undesirable constant time produced by the discharging of a capacitor in a frequency modulated relaxation oscillator is avoided. In FIG. 2*a*, a relaxation element shown as a capacitor 10 is connected in a circuit with means for causing current to alternately flow in one direction in the capacitor for an interval of time and in a reverse direction to said one direction in the capacitor for an interval of time under control of a modulating frequency source voltage superimposed upon a D.C. source voltage. This means comprises modulating frequency source voltage $V_m$, D.C. source voltage E, a pair of equal resistors 11 and 12, and switching means shown as trigger circuits 13, 14 and an electronic switch 15. The source voltages $V_m$, E, the resistor 11 and the capacitor 10 are all adapted to be connected in the order named in a first series loop via position 1 of the electronic switch 15 whereby charging current flows in the capacitor in one direction. The source voltages $V_m$, E, the resistor 12 and the capacitor 10 are all adapted to be connected in the order named in a second series loop via position 2 of the electronic switch 15 whereby charging current flows in the capacitor 10 in the reverse direction to said one direction. The trigger circuits 13 and 14 are adapted to be responsive to the predetermined trigger voltage $-V_t$, so that when the voltage at point A reaches $-V_t$, the electronic switch 15 will switch from position 1 to position 2 to simultaneously close the second series loop and open the first series loop; and when the voltage at point B reaches the $-V_t$, the electronic switch 15 will switch from position 2 to position 1 to simultaneously close the first series loop and open the second series loop.

The operation of this circuit will now be described with reference to the wave forms of FIG. 2*b*. When the electronic switch 15 is in position 1, the capacitor 10 charges through the resistor 11 from the voltage source $V_m+E$. When the potential at point A reaches the level of $-V_t$, the trigger circuit 13 is energized throwing the electronic switch 15 to position 2. Point A is then connected to ground via position 2 of the electronic switch and the capacitor 10 charges through the resistor 12 from the voltage source $V_m+E$. When the potential at point B reaches $-V_t$, the trigger circuit 14 is energized and throws the electronic switch 15 back to position 1. This process is repetitive and the voltage across the capacitor is a frequency modulated oscillation. The voltages at points A and B are shown in the first two wave forms of FIG. 2*b*, the voltage across the capacitor 10 being equal to the difference between the voltages at points A and B. It can be seen from the third wave form of FIG. 2*b* that the voltage across the capacitor 10 has a triangular wave form as long as the voltage $-V_t$ is low compared to source voltages $V_m+E$. FIG. 2*a* has been drawn so that the voltage sources $V_m+E$ cause the capacitor 10 to charge in a negative direction toward a negative trigger voltage $-V_t$. Of course, it is to be understood that in the case of positive source voltages the wave forms of FIG. 2*b* would be inverted with respect to their 0 voltage axes and the trigger voltage $V_t$ would also have a positive value. The choice of positive or negative voltages is merely a matter of design and either arrangement falls within the scope of applicant's invention.

The circuit of FIG. 2*a* will now be analyzed from a mathematical standpoint.

Let the source voltages $V_m+E$ be equal to V, the capacitor 10 be equal to C and the resistors 11 and 12 each equal to R. The mathematical expression for the capacitor voltage $V_c$ is:

$$V_c=V\left(1-e^{\frac{-t}{RC}}\right)-V_t e^{\frac{-t}{RC}} \qquad (1)$$

assuming $-V_t$ to be the voltage at $t=0$ for the purposes of this analysis.

Where $t$ is small compared with RC, the triggering voltage $-V_t$ will be small compared with V. The logarithmic function $$e^{\frac{-t}{RC}}$$

may then be approximated by $$1-\frac{t}{RC}$$

Substituting this expression in Equation 1 gives the time $t_1$ at which $V_c$ reaches the triggering level $-V_t$:

$$t_1=\frac{2RCV_t}{V+V_t} \qquad (2)$$

The frequency of oscillation F becomes $$F=\frac{1}{2t}=\frac{V+V_t}{4RCV_t} \qquad (3)$$

The voltage V comprises the D.C. source voltage E— producing a fixed carrier frequency $F_0$— upon which the modulating frequency source voltage $V_m$ is superimposed-producing the frequency deviation $\Delta F$. Thus, the linear frequency modulation produced can be expressed as:

$$F_0+\Delta F=\frac{E+V_m+V_t}{4RCV_t} \qquad (4)$$

giving the centre frequency $F_0$ as:

$$\frac{E+V_t}{4RCV_t} \qquad (5)$$

and the frequency deviation: $\Delta F$ as:

$$\frac{V_m}{4RCV_t} \qquad (6)$$

which shows that the frequency deviation $\Delta F$ is linearly related to the modulating frequency voltage $V_m$.

Figure 3:
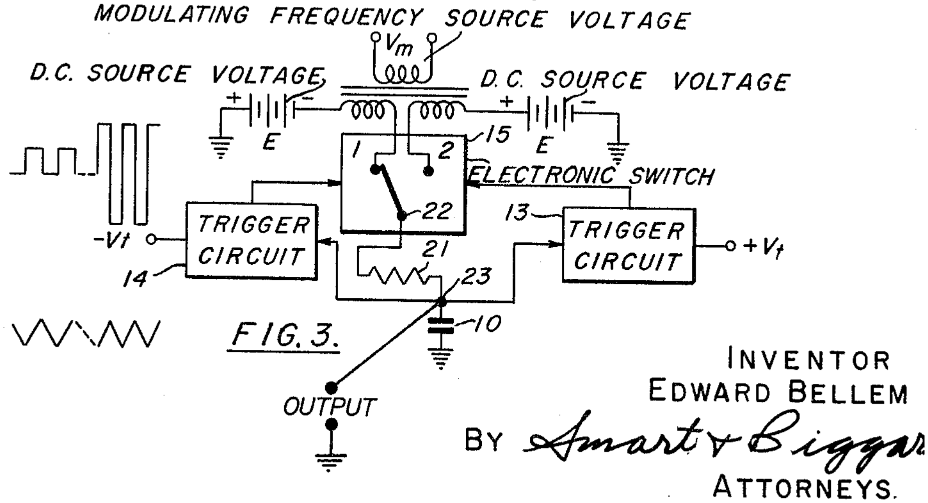
FIGS. 3 and 4 show modifications of the embodiment of FIG. 2*a*.

FIG. 3 shows a modification of the embodiment in FIG. 2*a*. Here the capacitor 10 is connected in series with a single resistor 21 to form an integrating circuit. The means for causing current to alternately flow in opposite directions in the capacitor comprises a pulse generating means for producing a substantially square wave pulse signal of which the amplitude of each pulse is determined by the amplitude of the modulating frequency source voltage superimposed upon the D.C. source voltage. This pulse generating means comprises the modulating frequency source voltage $V_m$, first and second D.C. source voltages E+ and E−, the trigger circuits 13 and 14 and the electronic switch 15. $V_m$, E−, the capacitor 10 and the resistor 21 are all adapted to be connected in the order named into a first series loop via position 1 of the electronic switch 15 whereby charging current flows in the capacitor 10 in one direction. $V_m$, E+, the capacitor 10 and the resistor 21 are all adapted to be connected in the order named in a second series loop via position 2 of the electronic switch 15 whereby the capacitor 10 is charged in the reverse direction to said one direction. The electronic switch 15 is adapted to switch back and forth between positions 1 and 2 under control of the trigger circuits 13 and 14 to produce at point 22 the square wave pulse signal, the amplitude of each pulse being determined by the amplitude of $V_m+E$. This square wave pulse signal is effectively integrated in the capacitor 10-resistor 21 integrating circuit to produce a triangular shaped wave form at point 23. The trigger circuits 13 and 14 are referenced to $+V_t$ and $-V_t$ respectively to control the operation of the electronic switch 15 and hence the frequency of the square wave pulse signal at point 22.

FIG. 4 shows a further modification of the embodiment in FIG. 2*a*. Here a single D.C. source voltage E is used and the electronic switch 15 switches between its positions 1*a*, 1*b* and 2*a*, 2*b* to change the direction of charging current in the capacitor 10 at the end of each half oscillation cycle.

A complete circuit utilizing the principles of the embodiment shown in FIG. 2*a* will now be described with reference to FIG. 5. FIG. 5 includes the source voltages $V_m$, E, the capacitor 10 and the resistors 11 and 12 as in FIG. 2*a*. The trigger circuits 13 and 14 are conventional Schmitt triggers employing two transistors each $T_1$, $T_2$ and $T_3$, $T_4$, respectively. The electronic switch 15 comprises a flip-flop circuit incorporating two transistors $T_5$ and $T_6$ and a pair of switching transistors $T_7$ and $T_8$. All of the transistors in FIG. 5 are of the PNP conductivity type. However, it is to be understood that NPN conductivity type transistors could be used where positive source voltages were employed.

Point A is coupled to the base of the transistor $T_1$ through a resistor 31-capacitor 32 parallel network. The emitter of the transistor $T_1$ is connected through a resistor 33 to ground. The output from its collector is taken across the collector load resistor 34 at point C and coupled to the base of the transistor $T_2$ through a resistor 35-capacitor 36 parallel network. The base of the transistor $T_2$ is connected through a resistor 37 to ground and its emitter is connected to the emitter of the transistor $T_1$. The output from the collector of the transistor $T_2$ is taken across its collector load resistor 38 at point E and coupled to the base of the transistor $T_5$ through a resistor 39-capacitor 40 parallel network and a resistor 41. The output across the resistor 34 is also coupled to the base of the transistor $T_6$ via a capacitor 42-resistor 43 differentiating network and a diode 44.

Point B is coupled to the base of the transistor $T_3$ through a resistor 45-capacitor 46 parallel network. The emitter of the transistor $T_3$ is connected through a resistor 47 to ground. The output from its collector is taken across the collector load resistor 48 at point D and coupled to the base of the transistor $T_4$ through a resistor 49-capacitor 50 parallel network. The base of the transistor $T_4$ is connected through a resistor 51 to ground and its emitter is connected to the emitter of the transistor $T_3$. The output from the transistor $T_4$ is taken across its collector load resistor 52 at point F and coupled to the base of the transistor $T_6$ through a resistor 53-capacitor 54 parallel network and a resistor 55. The output across the resistor 48 is also coupled to the base of the transistor $T_5$ through a capacitor 56-resistor 57 differentiating network and a diode 58.

As can be readily seen the $T_1$—$T_2$ and $T_3$—$T_4$ Schmitt trigger circuits are identical.

The base of the transistor $T_5$ is connected to a positive source potential B+ through a resistor 59 and to point G through a resistor 60. Its emitter is connected to ground and its output is taken across its collector load resistor 61 at point H.

Similarly, the base of the transistor $T_6$ is connected to a positive source potential B+ through a resistor 62 and to point H through a resistor 63. Its emitter is connected to ground and its output is taken across its collector load resistor 64 at point G.

The base of the transistor $T_7$ is connected to a positive source potential B+ through a resistor 65 and to point G through a resistor 66. Its emitter is connected to ground and its collector output is connected to point A.

Similarly, the base of the transistor $T_8$ is connected to a positive source potential through a resistor 67 and to point H through a resistor 68. Its emitter is connected to ground and its collector output is connected to point B.

With the electronic switch 15 in position 1 (FIGURE 2*a*), at the beginning of one half cycle of operation, assume that transistors $T_2$, $T_4$, $T_6$ and $T_8$ are "on" (conducting) and transistors $T_1$, $T_3$, $T_5$ and $T_7$ are "off" (non-conducting). The capacitor 10 then begins to charge through a series loop comprising $V_m$, E, the resistor 11, the capacitor 10 point B and the emitter-collector junction of the transistor $T_8$. As long as the voltage at point A is positive with respect to the emitter of the transistor $T_1$, this transistor will remain off. Resistors 34, 35 and 37 are so chosen that the base of the transistor $T_2$ is sufficiently negative with respect to its emitter so that it is saturated. The voltage across the resistor 33 is determined by the negative supply source B− and the values of the resistors 33 and 38. Since the voltage across the resistor 33 also appears at the emitter of the transistor $T_1$, it determines the triggering voltage $-V_t$.

Figure 6:
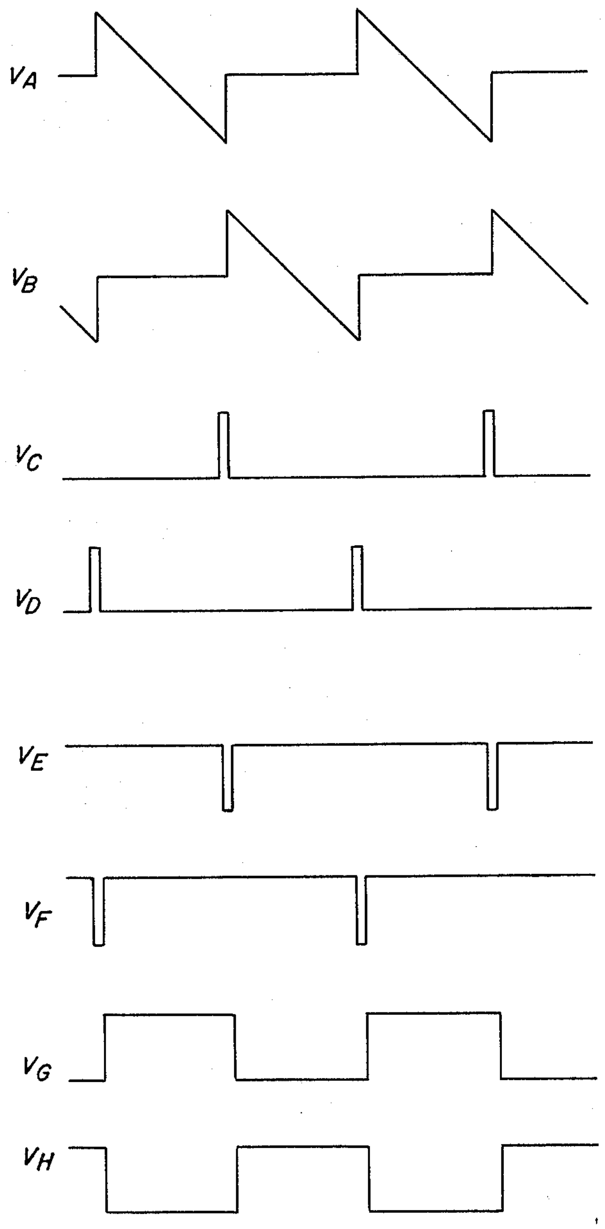
FIG. 6 is a set of voltage-time wave forms at various points in the circuitry of FIG. 5.

As the capacitor 10 charges through the resistor 11, the potential at the point A goes into the negative direction until the base of the transistor $T_1$ becomes sufficiently negative with respect to its emitter for the transistor $T_1$ to be turned "on." When the transistor $T_1$ starts conducting, increasing current through the resistor 34 raises the potential at the point C. This change in potential is transferred to the base of the transistor $T_2$ turning it "off" and decreasing the current flowing through the resistors 33 and 38 and the potential at the point E. The effect of decreasing current through the resistor 33 is to make the emitter of the transistor $T_1$ less negative which causes the current through this transistor to increase thus amplifying the original cause of trigger action. The result of this trigger action is a steep positive pulse at point C and a steep negative pulse at point E as shown in FIGURE 6. Both these pulses are used to switch the flip-flop circuit comprising the transistors $T_5$ and $T_6$ from one state into the other. The positive pulse at point C is differentiated through the capacitor 42 and the resistor 43 and applied via the diode 44 to the base of the transistor $T_6$. This pulse switches the transistor $T_6$ "off."

At the same time, the negative pulse at point E is fed via resistor 39-capacitor 40 network and the resistor 41 to the base of the transistor $T_5$. This pulse switches the transistor $T_5$ "on" increasing the current flowing through the resistor 61. The increased current through the resistor 61 causes the base of the transistor $T_6$ to go more positive with respect to its emitter thereby sustaining the "off" condition of the transistor $T_6$.

The "on" condition of the transistor $T_5$ causes the potential at the point H to increase while the "off" condition of the transistor $T_6$ causes the potential at the point G to decrease. The base of the transistor $T_7$ thus goes sufficiently negative with respect to its emitter to bring it into the "on" condition. At the same time the base of the transistor $T_8$ goes sufficiently positive with respect to its emitter to bring it into the "off" condition. This causes the capacitor 10 to start charging in a circuit comprising $V_m$, E, the resistor 12, point B the capacitor 10, point A and the emitter-collector junction of the transistor $T_7$.

At this moment the transistors $T_2$, $T_4$, $T_5$ and $T_7$ are in the "on" condition and the transistors $T_1$, $T_3$, $T_6$ and $T_8$ are in the "off" condition.

In a similar manner, when the point B reaches a sufficiently negative potential to bring the transistor $T_3$ into the "on" condition, the above described process which in turn switches the transistor $T_4$ into the "off" condition takes place. This causes the flip-flop circuit comprising the transistors $T_5$ and $T_6$ to change their state with the transistor $T_6$ being in the "on" condition and the transistor $T_5$ in the "off" condition. The potential at point H decreases and the potential at point G increases switching the transistor $T_8$ "on" and the transistor $T_7$ "off."

This process is repetitive and the wave forms appearing at the various points A to H of FIG. 5 are shown in FIG. 6. The frequency modulated output can be obtained from various points in the circuit of FIG. 5:

(1) Across the capacitor 10 delivering a triangular wave form of rather low voltage, balanced with respect to ground.

(2) From points E or F delivering a sharp short pulse the peak power of which depends on the negative power supply voltage B− and the power handling capability of the transistors $T_2$ and $T_4$. This sharp pulse is very suitable for driving a frequency multiplier stage in order to obtain a higher deviation at a higher centre frequency. A combination of the output at points E and F will give a pulse output of which the pulse repetition frequency is twice that of the modulator frequency.

(3) From points H or G, delivering a square wave signal of which the peak power depends on the negative power supply voltage B− and the power handling capability of the transistors $T_5$ and $T_6$. The combination of the output at points H and G gives an output which is symmetrical with respect to ground.

Referring to FIG. 7*a* and to the voltage-time wave forms of FIG. 7*b* a further modification of the embodiment of FIG. 2*a* will be described. A pair of equal compensating resistors 11′ and 12′ are connected in both series loops, the resistor 11′ being connected between one side of the capacitor 10 and the point A, and the resistor 12′ being connected between the other side of the capacitor and the point B.

At the moment of switching of the electronic switch 15, the current through the resistors 11′ and 12′ produces a voltage that is opposed to the voltage across the capacitor 10. This opposition voltage is linearly related to the modulating frequency source voltage $V_m$ superimposed upon the D.C. source voltage E.

At the start of a half-cycle when point A (or point B) returns to ground, the potential at these points takes a positive jump, which in the absence of the resistors 11′ and 12′ would be equal to $V_t$ (the capacitor 10 voltage at the moment of switching). With the resistors 11′ and 12′ (equal to R′) in series with the capacitor 10, the positive jump at point A will be smaller due to the opposition voltage $V_r$ produced where:

$$V_r=\frac{2R'}{2R'+R}(V+V_c) \qquad (7)$$

Where R is the value of either resistor 11 or 12 and $V_c$ is the voltage across the capacitor.

Since $V_r$ depends on V, the positive jump at the start of each half cycle becomes smaller with increasing V. This effect is illustrated in the wave forms of FIG. 7*b*.

For low frequencies, the first wave form shows that the effect of compensation is small. The second wave form shows how the effect is greater at intermediate frequencies. The third wave form shows the effect at high frequencies where $V_r$ is larger than $V_c$ causing the jump at points A or B to be in the negative direction.

Thus, it can be seen that non-linearity due to voltage-time characteristics of the capacitor 10 at lower frequencies and the finite switching time at higher frequencies is reduced by the provision of the compensating resistors 11′ and 12′.

Referring to FIG. 8, a further embodiment of the invention will now be described. This embodiment permits fast operation of the frequency modulated relaxation oscillator at high frequencies. For example, satisfactory results have been achieved in practice with a modulator operating at a centre frequency of 23.3 mc./s.

In this embodiment, the pulse generating means for producing a substanially square wave pulse signal of which the amplitude of each pulse is limited according to the amplitude of the modulating frequency source voltage superimposed upon the D.C. source voltage comprises: a tunnel diode circuit 70, amplifying and phase reversing means 71 and amplitude limiting means 72.

The tunnel diode circuit 70 comprises a pair of tunnel diodes 73, 74 serially connected together between respective biasing means 75 and 76 to conduct forward current in the same direction slightly below their peak current. Each tunnel diode is capable of assuming two stable voltage states, one tunnel diode being adapted to be in its high voltage state when the other is in its low voltage state and vice-versa. The tunnel diodes are adapted to change their voltage states in response to a current of predetermined amplitude applied to their junction point 77. With the periodic switching of the tunnel diodes 73 and 74, a substantially square wave pulse signal is produced at their junction point 77.

This square wave signal (illustrated in FIG. 9) is inductively coupled through an inductor 78 to the input of the amplifying and phase reversing means 71.

This means comprises a two stage amplifier composed of transistors $T_9$ and $T_{10}$. The transistor $T_9$ is connected as an emitter follower to provide sufficient current to drive the transistor $T_{10}$. The base of the transistor $T_9$ is connected to the inductor 78, the collector is connected to biasing means 76 and the emitter is connected through a tunnel diode 79 to the biasing means 75. The output from the emitter is taken across its load (tunnel diode 79) and directly coupled to the base of the transistor $T_{10}$. The provision of the tunnel diode 79 in the emitter load of the transistor $T_9$ gives an ouput signal of very short rise time.

The emitter of the transistor $T_{10}$ is connected to a positive source potential B+ through a resistor 80. The output from the collector is taken between its collector load resistors 81 and 82 and applied to point 83 through a D.C. blocking capacitor 84. Bias for the transistor $T_{10}$ is provided by a potentiometer 85 and a resistor 86 serially connected between the source potential B+ and B−. The source potentials B+ and B− are floating, while the sources 75, 76 and 89, 90 (to be mentioned later) are balanced with respect to ground. A capacitor 87 is provided to isolate the source potentials for the transistors $T_9$ and $T_{10}$. The two load resistors 81 and 82 are included to drive the subsequent circuits from approximately the same impedance for both positive and negative going pulses. Thus, the square wave pulse signal at point 77 is amplified, reversed in phase and applied to point 83.

The amplitude limiting means 72 comprises a transformer 88 having a primary winding and a pair of secondary windings for connection of the modulating frequency source voltage $V_m$, a connection 89 for a first D.C. source voltage E— of one polarity, a connection 90 for a second D.C. source voltage E+ of equal voltage but reverse polarity to E— and a pair of diodes 91 and 92. The modulating frequency source voltage $V_m$ is connected in series with the D.C. source voltages E— and E+ through the secondary windings of the transformer in push-pull relationship with the anode of the diode 91 and the cathode of the diode 92, respectively. The cathode of the diode 91 and the anode of the diode 92 are connected to the point 83. Thus, each pulse of the amplified and phase reversed square wave pulse signal has its amplitude limited in accordance with the amplitude of the modulating frequency source voltage superimposed upon the D.C. source voltage due to the conduction of diodes 91 and 92 during alternate half-cycles of oscillation. The modulating frequency source voltage $V_m$ superimposed upon the D.C. source voltage E and the voltage at point 83 are illustrated in FIG. 9.

The point 83 is connected to the input of an integrating circuit 93 comprising a resistor 94 connected in series with an inductor 95. The output from the integrating circuit 93 is connected to the junction 77 of the tunnel diodes 73 and 74.

The integrating circuit 93 is responsive to the voltage at point 83 to produce a triangular shaped integrated current waveform as illustrated in FIG. 9. When current flowing through the inductor 95 in the negative direction reaches a predetermined amplitude (depending upon the characteristics of the tunnel diodes 73 and 74), the tunnel diode 74 switches to its high voltage state simultaneously with the switching of the tunnel diode 73 to its low voltage state. Similarly, when current flowing through the inductor 95 in the positive direction reaches the predetermined amplitude, the tunnel diode 73 switches to its high voltage state simultaneously with the switching of the tunnel diode 74 to its low voltage state. It can be seen that the frequency of the pulse signal generated at junction 77 is controlled by the current flow in the inductor, which in turn is controlled by the modulating frequency source voltage superimposed upon the D.C. source voltage. Therefore, the frequency modulated oscillation output which can be taken at the integrating circuit 93 is linearly related to the source voltages $V_m+E$.

It is to be understood that according to the applicant's invention the integrating circuit 93 can also comprise a resistor-capacitor network. However, since the tunnel diodes 73 and 74 are essentially current operated devices, the driving point impedance is low. Therefore, a relatively large resistor would have to be inserted between the integrating circuit 93 and the junction 77 of the tunnel diodes 73 and 74. This would effectively decrease the trigger sensitivity of the tunnel diodes. In practice, the choice between an R–C or R–L integrating circuit is dictated by the voltage or current sensitivity of the triggering device used.

From the above description of applicant's invention, it can be seen that an improved frequency modulated relaxation oscillator has been provided whereby the linearity of the oscillator is improved and hence the maximum frequency at which linearity can be obtained is significantly increased.

I claim:

1. A frequency modulated relaxation oscillator comprising a reactive relaxation element, means for causing current flow to flow in one direction to said element and in the reverse direction to said one direction to said element for an interval of time under control of a modulating frequency source voltage superimposed upon a D.C. source voltage, and means for alternating the flow to said element in said one and reverse directions whenever the voltage across or the current flowing to said element reaches a predetermined level of one polarity and substantially the same level of opposite polarity respectively.

2. An oscillator as defined in claim 1 comprising an integrating circuit including said element, said means comprising pulse generating means for producing a substantially square wave pulse signal to which the amplitude of each pulse is limited according to the amplitude of the modulating frequency source voltage superimposed upon the D.C. source voltage, the integrating circuit being responsive to said pulse signal to derive an integrated signal therefrom, the pulse generating means being responsive to the integrated signal whereby the polarity excursion of said pulse signal is reversed whenever the amplitude of the integrated signal reaches said predetermined levels.

3. An oscillator as defined in claim 1 wherein said element is a capacitor; said means comprising a connection for the modulating frequency source voltage, a connection for the D.C. source voltage and first and second equal resistors, the connection for the modulating frequency source voltage, the D.C. source voltage, the first resistor and the capacitor all being adapted to be connected in the order named in a first series loop whereby charging current flows to the capacitor in said one direction; the connection for the modulating frequency source voltage, the connection for the D.C. source voltage the second resistor and the capacitor, all being adapted to be connected in the order named in a second series loop whereby charging current flows to the capacitor in the reverse direction to said one direction; and switching means adapted to alternately effect a simultaneous closing of the second series loop with an opening of the first series loop and a simultaneous closing of the first series loop with an opening of the second series loop in response to a voltage at said predetermined levels across the capacitor while charging current is flowing thereto.

4. An oscillator as defined in claim 2 wherein said element is a capacitor, the integrating circuit comprising the capacitor connected in series with a resistor, the pulse generating means comprising a connection for the modulating frequency source voltage, a connection for the D.C. source voltage, switching means having first and second positions of operation and first and second voltage sensitive trigger means, the switching means when in its first position of operation connecting the connection for the modulating frequency source voltage, the connection for the D.C. source voltage, the capacitor and the resistor in the order named into a first series loop, the switching means when in its second position of operation connecting the connection for the modulating frequency source voltage, the D.C. source voltage, the resistor and the capacitor in the order named into a second series loop, said first and second trigger means when energized being adapted to alternately place the switching means in its first and second positions of operation respectively, said first and second trigger means being responsive to a voltage at said predetermined levels developed at the junction of the resistor and the capacitor, whereby said first trigger means is energized by said voltage having one polarity and said second trigger means is energized by said voltage having the opposite polarity to said one polarity.

5. An oscillator as defined in claim 2 wherein said element is a capacitor, the integrating circuit comprising the capacitor connected in series with a resistor, the pulse generating means comprising a connection for the modulating frequency source voltage, a connection for a first D.C. source voltage, a connection for a second D.C. source voltage of equal potential to the first D.C. source voltage, switching means having first and second positions of operation and first and second voltage sensitive trigger means, the switching means when in its first position of operation connecting the connection for the modulating frequency source voltage, the connection for the first D.C. source voltage, the capacitor and the resistor in the order named into a first series loop, the switching means when in its second position of operation connecting the connection for the modulating frequency source voltage, the connection for the second D.C. source voltage, the capacitor and the resistor in the order named into a second series loop, said first and second trigger means when energized being adapted to alternately place the switching means in its first and second positions of operation respectively, said first and second trigger means being responsive to a voltage at said predetermined level developed at the junction of the resistor and the capacitor, whereby said first trigger means is energized by said voltage having one polarity and said second trigger means is energized by said voltage having the opposite polarity to said one polarity.

6. An oscillator as defined in claim 2 wherein the pulse generating means comprises a pair of tunnel diodes serially connected together between respective biasing means to conduct forward current in the same direction, each of the tunnel diodes being capable of assuming two stable voltage states, one tunnel diode being adapted to be in its high voltage state when the other is in its low voltage state and vice-versa, the tunnel diodes being responsive at their junction to the integrated signal to switch their voltage states when the amplitude of the integrated signal reaches said predetermined levels, whereby a substantially square wave pulse signal is produced, means for amplifying and reversing the phase of said square wave pulse signal and means for limiting the amplitude of each pulse according to the amplitude of the modulating frequency source voltage superimposed upon the D.C. source voltage.

7. An oscillator as defined in claim 6 wherein said amplitude limting means comprises a connection for the modulating frequency voltage source, a connection for a first D.C. source voltage of one polarity, a connection for a second D.C. source voltage of equal voltage but reverse polarity to said first D.C. source voltage, first and second diodes, means for connecting the connection for the modulating frequency source voltage in series with the connection for the first D.C. source voltage and the connection for the second D.C. source voltage in push-pull relationship with the anode of the first diode and the cathode of the second diode respectively, the cathode of the first diode and the anode of the second diode being connected together and to said amplified and phase reversed square wave pulse signal.

8. An oscillator as defined in claim 6 wherein said element is an inductor, the integrating circuit comprising the inductor connected in series with a resistor, the tunnel diodes being responsive at their junction to a current at said predetermined level flowing through the inductor, whereby one tunnel diode is switched to its high voltage state simultaneously with the switching of the other tunnel diode to its low voltage state in response to said current having one polarity, and one tunnel diode is switched to its low voltage state simultaneously with the switching of the other tunnel diode to its high voltage state in response to said current having the opposite polarity to said one polarity.

9. An oscillator as defined in claim 3 wherein said switching means comprises first and second trigger circuits and an electronic switch, the first trigger circuit being responsive to a predetermined potential at one side of the capacitor when the first series loop is closed to produce a first pulse signal, the second trigger circuit being responsive to said predetermined potential at the other side of the capacitor when the second series loop is closed to produce a second pulse signal, the electronic switch being responsive to the first pulse signal to simultaneously open the first series loop and close the second series loop and to the second pulse signal to simultaneously open the second series loop and close the first series loop.

10. An oscillator as defined in claim 9 further comprising third and fourth equal resistors connected in both series loops, one being connected between one side of the capacitor and the first trigger circuit, the other being connected between the other side of the capacitor and the second trigger circuit, whereby at the moment of switching, a voltage opposed to the voltage across the capacitor is produced that is linearly related to the modulating frequency source voltage superimposed upon the D.C. source voltage.

11. An oscillator as defined in claim 9 wherein the electronic switch comprises a flip-flop circuit having two inputs and two outputs and first and second switching transistors of like conductivity; the first transistor having its emitter-collector junction connected in series with the first series loop between one of said source connections and one side of the capacitor; the second transistor having its emitter-collector junction connected in series with the second series loop between one of said source connections and the other side of the capacitor; the base of each transistor being connected to separate outputs of the flip-flop circuit so that for one stable state of the flip-flop circuit, the first transistor is conducting and the second transistor is non-conducting, and for the other stable state of the flip-flop circuit, the second transistor is conducting and the first transistor is non-conducting; the flip-flop circuit being responsive at its inputs to the first and second pulse signals to switch its outputs from one stable state to the other.

12. An oscillator as defined in claim 11 wherein the first and second pulse signals each comprise a pair of pulses of opposite polarity, one pulse of each pair being applied to separate inputs of the flip-flop circuit to increase its speed of switching from one stable state to the other.

13. A frequency modulated relaxation oscillator comprising a direct voltage source, a modulating frequency voltage source connected in series with the direct voltage source, a capacitor connected to and charged by said voltage sources, triggering means connected to the capacitor and giving a trigger signal whenever the voltage across the capacitor reaches a predetermined level, and switching means connected to the capacitor and to the triggering means and to the said voltage sources and sequentially effecting discharge of the capacitor and reversing the direction of flow of current from said voltage sources to the capacitor in response to sequential trigger signals.

14. A frequency modulated relaxation oscillator comprising a voltage source producing a direct voltage and a modulating frequency voltage superimposed on the direct voltage, a pair of resistors of equal resistance each having one of its terminals connected to one terminal of the voltage source, a capacitor connected between the other terminals of said resistors, a two-position switch connected across the capacitor and sequentially connecting each of the capacitor terminals to the other terminal of the voltage source in response to sequential trigger signals, a first trigger circuit connected to said switch and to one terminal of the capacitor and transmitting said trigger signal to the switch when the voltage at said one terminal of the capacitor reaches a predetermined level, and a second trigger circuit connected to said switch and to the other terminal of the capacitor and transmitting a trigger signal to the switch when the voltage at said other terminal of the capacitor reaches said predetermined level.

15. A frequency modulated relaxation oscillator comprising a voltage source producing a direct voltage and a modulating frequency voltage superimposed on the direct voltage, a pair of resistors of equal resistance each having one of its terminals connected to one terminal of the voltage source, a capacitor connected between the other terminals of said resistors, a two-position switch connected across the capacitor and sequentially connecting each of the capacitor terminals to the other terminal of the voltage source in response to sequential trigger signals, trigger means connected to said switch and to the terminals of the capacitor and transmitting said trigger signal to the switch when the voltage at either terminal of the capacitor reaches a predetermined level.

16. A frequency modulated relaxation oscillator comprising a first voltage source producing a direct voltage and a modulating frequency voltage superimposed on the direct voltage, a second voltage source producing said direct voltage and said modulating frequency votage superimposed on the direct voltage, a capacitor having one of its terminals connected to the negative terminal of the first voltage source and to the positive terminal of the second voltage source, a two position switch connected between the other terminal of the capacitor and said voltage sources and alternately and sequentially connecting said one terminal of the capacitor to the positive terminal of the first voltage source and the negative terminal of the second voltage source respectively in response to sequential trigger signals, a first trigger circuit connected to said other terminal of the capacitor and to the switch and transmitting said trigger signal to the switch when the voltage across the capacitor reaches a predetermined level, and a second trigger circuit connected between the other terminal of the capacitor and to the switch and transmitting said trigger signal to the switch when the voltage across the capacitor reaches the negative of said predetermined level.

17. Apparatus as defined in claim 16 wherein the said other terminal of the capacitor is connected to the switch through a resistor.

18. A frequency modulated relaxation oscillator comprising a first voltage source producing a direct voltage and a modulating frequency voltage superimposed on the direct voltage, a second voltage source producing said direct voltage and said modulating frequency voltage superimposed on the direct voltage, a capacitor having one of its terminals connected to the negative terminal of the first voltage source and to the positive terminal of the second voltage source, a two position switch connected between the other terminal of the capacitor and said voltage sources and alternately and sequentially connecting said one terminal of the capacitor to the positive terminal of the first voltage source and the negative terminal of the second voltage source respectively in response to sequential trigger signals, trigger means connected to the other terminal of the capacitor and to the switch and transmitting said trigger signal to the switch when the voltage across the capacitor reaches a predetermined level and when the voltage across the capacitor reaches the negative of said predetermined level.

19. A frequency modulated relaxation oscillator comprising a voltage source producing a direct voltage and a modulating frequency voltage superimposed on the direct voltage, a capacitor in series with and charged by the voltage source, a two-position switch connected to the capacitor and to the voltage source and alternately and sequentially reversing the polarity of the voltage source with respect to the capacitor in response to sequential trigger signals, a first trigger circuit connected to the capacitor and to the switch and transmitting said trigger signal to the switch when the voltage across the capacitor reaches a predetermined level, and a second trigger circuit connected to the capacitor and to the switch and transmitting said trigger signal to the switch when the voltage across the capacitor reaches the negative of said predetermined level.

20. Apparatus as defined in claim 19 wherein the switch is connected to the capacitor through a resistor.

21. A frequency modulated relaxation oscillator comprising a voltage source producing a direct voltage and a modulating frequency voltage superimposed on the direct voltage, a capacitor in series with and charged by the voltage source, a two-position switch connected to the capacitor and to the voltage source and alternately and sequentially reversing the polarity of the voltage source with respect to the capacitor in response to sequential trigger signals, trigger means connected to the capacitor and to the switch and transmitting said trigger signal to the switch when the voltage across the capacitor reaches a predetermined level and when the voltage across the capacitor reaches the negative of said predetermined level.

References Cited by the Examiner

UNITED STATES PATENTS

| | | | |
|---|---|---|---|
| 2,470,028 | 5/1949 | Gordon | 332—14 |
| 2,492,736 | 12/1949 | Gustin | 332—14 |
| 2,701,311 | 2/1955 | Gray | 332—14 |
| 2,750,502 | 6/1956 | Gray | 332—14 |
| 2,996,575 | 8/1961 | Sims | 332—14 |

NATHAN KAUFMAN, *Primary Examiner.*

ROY LAKE, *Examiner.*

A. L. BRODY, *Assistant Examiner.*